Figure 1:
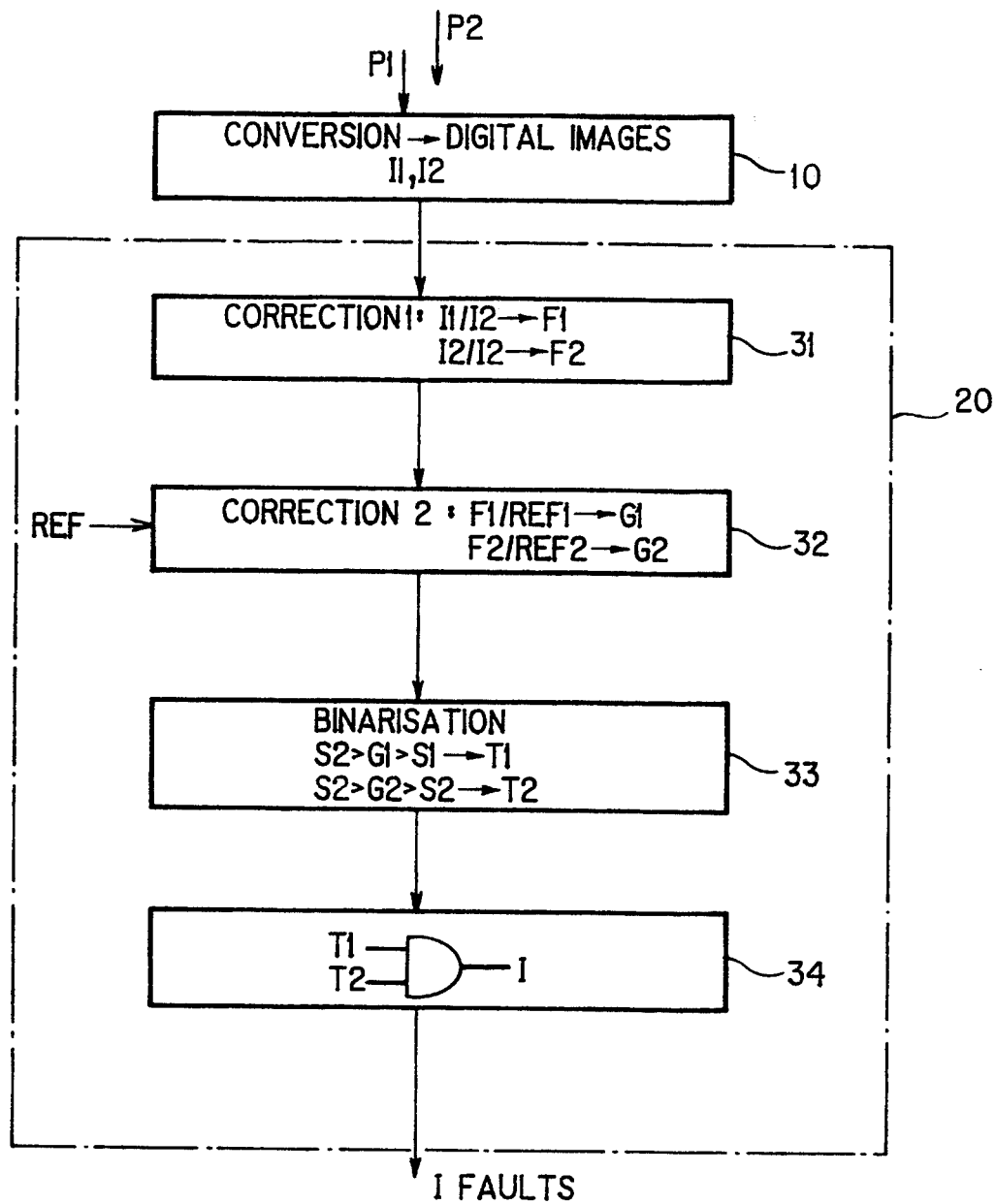

United States Patent [19]
Prejean-Lefevre

[11] Patent Number: 5,351,307
[45] Date of Patent: Sep. 27, 1994

[54] PROCESS AND APPARATUS FOR THE ACQUISITION AND PROCESSING OF SCREEN IMAGES

[75] Inventor: Véronique H. M. P. Prejean-Lefevre, Sceaux, France

[73] Assignee: Societe Nationale d'Etude et de Construction de Moteurs d'Aviation "S.N.E.C.M.A.", Paris, France

[21] Appl. No.: 967,437

[22] Filed: Oct. 28, 1992

[30] Foreign Application Priority Data

Nov. 15, 1991 [FR] France ............................ 91 14068

[51] Int. Cl.$^5$ .................. G06K 9/00; G01B 15/06; G01N 21/00
[52] U.S. Cl. ........................................... 382/8; 382/62; 378/58; 356/237
[58] Field of Search ................. 382/8, 41, 49, 48, 1, 382/62; 358/106; 356/237; 378/58; 348/129, 130

[56] References Cited

U.S. PATENT DOCUMENTS

| | | | |
|---|---|---|---|
| 4,477,926 | 10/1984 | Linger et al. | 382/8 |
| 4,644,585 | 2/1987 | Crimmins et al. | 382/41 |
| 4,920,572 | 4/1990 | Sugita et al. | 382/48 |
| 4,937,878 | 6/1990 | Lo et al. | 382/48 |
| 4,975,972 | 12/1990 | Bose et al. | 382/8 |
| 5,129,009 | 7/1992 | Lebeau | 382/8 |
| 5,179,419 | 1/1993 | Palmquist et al. | 382/8 |

FOREIGN PATENT DOCUMENTS 2129546 5/1984 United Kingdom .

OTHER PUBLICATIONS

IBM Technical Disclosure Bulletin, vol. 30, No. 4, Sep. 1987, pp. 1647–1649, "Multiple-Image Vision Inspection Process".

Primary Examiner—Joseph Mancuso
Assistant Examiner—David Fox
Attorney, Agent, or Firm—Oblon, Spivak, McClelland, Maier & Neustadt

[57] ABSTRACT

The present invention relates to a process for the acquisition and processing of screen images or radiographs and to an apparatus making it possible to inspect or control mechanical parts. The process consists of obtaining at least two screen images of the part to be inspected, converting said images into digital video images coded on several grey levels, correcting each image with respect to itself and then with respect to a reference image and finally binarizing the corrected images in order to superimpose them, so as to determine the image points which correspond and thus detect defects. Application to the control and inspection of mechanical parts.

12 Claims, 2 Drawing Sheets

PROCESS AND APPARATUS FOR THE ACQUISITION AND PROCESSING OF SCREEN IMAGES

DESCRIPTION

The present invention relates to a process and an apparatus for the real time acquisition and processing of screen images or radiographs.

The invention applies to the detection of faults and defects in materials used in the formation of various mechanical parts, particularly parts like turbine blades.

The invention relates to a process and an apparatus for the real time acquisition and processing of screen images using an X-ray source and a brightness amplifier detector for obtaining a radioscopy of the material of the part to be inspected.

The apparatus also has video means making it possible to obtain digital images and processing means making it possible to carry out various filtering operations in order to detect any faults in the material of the part to be inspected.

It is known from U.S. Pat. No. 4,125,771 to use an X-ray apparatus for analysing residual stresses and the crystallographic structure of nickel or titanium-based materials. For this purpose the apparatus comprises two X-ray sources, which irradiate the same surface in accordance with different angles and two detectors for detecting the diffracted X-rays in particular crystallographic planes.

It is also known from FR-A-2,643,716 to use X-ray beams for checking the crystallographic quality of large objects having a monocrystalline structure, such as turbine blades. For this purpose the apparatus comprises a brightness amplifier, a video camera and a computer-based image processing means.

Reference can also be made to the prior art constituted by EP-A-234,537, which describes an automatic inspection device using X-rays for detecting faults in turbine blades. This apparatus comprises a data acquisition system, a display system, a computer and software for data storage purposes.

The Applicant has found that by using these conventional procedures and in particular an apparatus in which an automatic inspection takes place by X-rays and in which use is then made of a brightness amplifier and a video camera photography chain, together with image processing means, that the signal-to-noise ratio deteriorates during the inspections or controls, said deterioration being due to various disturbances to the inspection or control chain.

As the precise causes of this deterioration in the signal-to-noise ratio are not known, the Applicant carried out a behavioural study on such an installation. In order to carry out this study, two images were taken from the radioscopic chain, the acquisition of these two images taking place successively under the same shooting conditions and without moving the part. It was thus possible to confirm that the image of the part had background level and contrast variations on the information and residual noise.

The Applicant also found that the background correction for correcting the fault in the photographic chain and which is carried out by the image processing system seems to lose its effectiveness and efficiency in the course of time. The image obtained is dependent on the entire control chain, so that disturbances potentially come from the emission of X-rays, the brightness amplifier, the camera or the image processing system.

The present invention makes it possible to obviate these difficulties. It relates to a process for the real time acquisition and processing of screen images for inspecting a part, which consists of obtaining at least two screen images for each view of the part to be inspected, converting said screen images into digital video images and processing each image on the one hand by carrying out a correction of each image with respect to itself and on the other hand by correcting the image which has already been corrected with respect to itself, relative to a reference image of a part not having any fault or defect. The reference image, like the inspected image, has previously been corrected with respect to itself. The process then consists of carrying out a binarization of the images by a thresholding operation, followed by the superimposing of the thus obtained binary images in order to determine the image points which correspond and in this way faults or defects in the part can be detected.

The first correction consists of carrying out a linear frequency or morphological filtering on classified points and the second consists of carrying out a frequency or morphological filtering in order to separate the image from the background.

Binarization of the images takes place by comparing each image with a threshold, so as to only retain the image points which are equal to or above said threshold and which are liable to correspond to a fault in the part.

The invention is also directed at an apparatus for the acquisition and processing of screen images having means for obtaining at least two images of each view of a part to be inspected, the image procesing means comprising first correcting means for each image and second correcting means for each image, thresholding means and means ensuring a logic AND function between the two images after thresholding.

The invention is described in greater detail hereinafter relative to a non-limitative embodiment and with reference to the attached drawings, wherein show:

FIG. 1 the different stages of the process according to the invention in the form of a succession of functional blocks.

Figure 2:
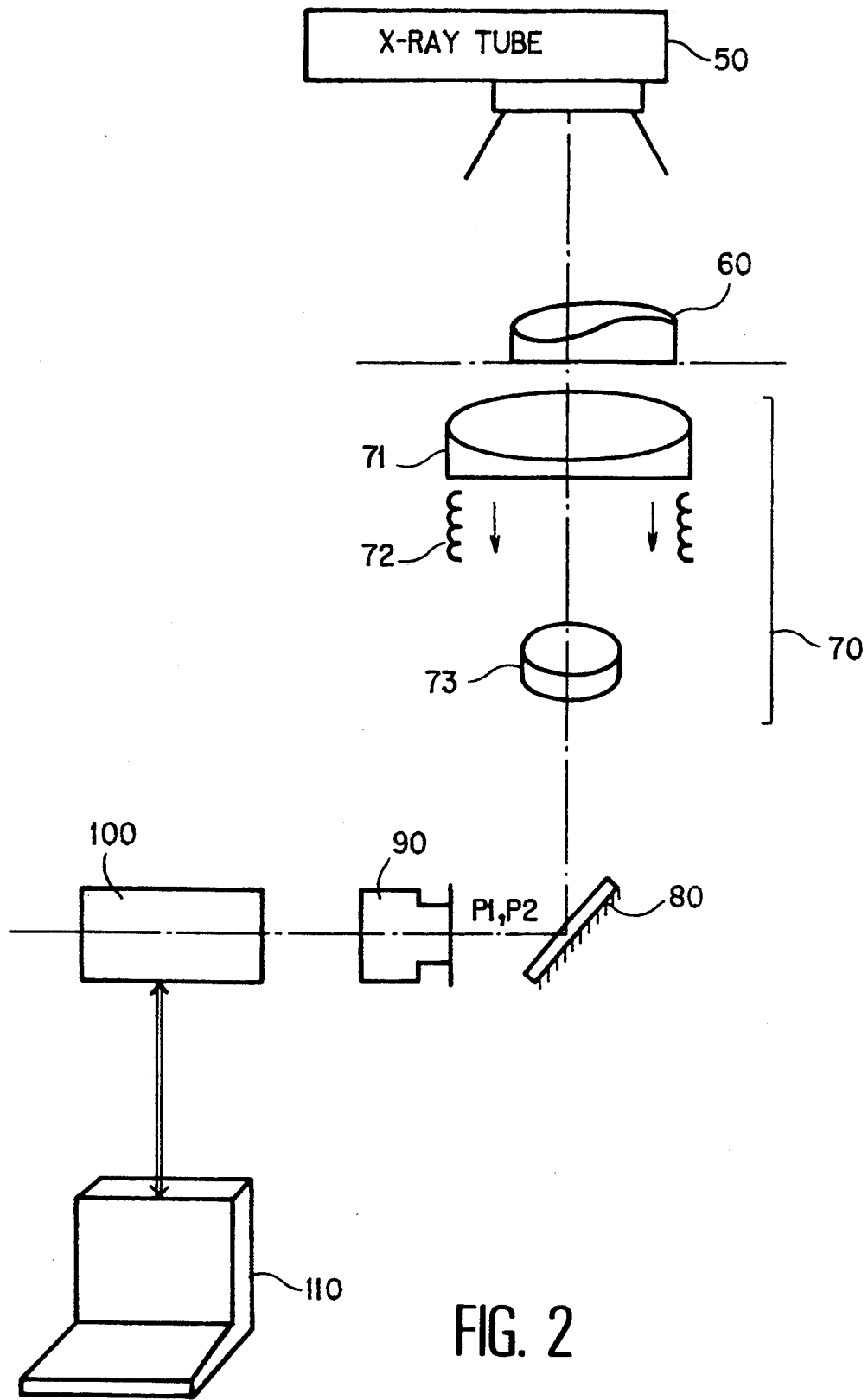

FIG. 2 an apparatus making it possible to perform the process according to the invention.

According to the process of the invention, the part to be inspected is successively irradiated at least twice under identical conditions and in accordance with the same view, so as to obtain two images P1 and P2 after passing into a brightness amplifier and a focussing optics. These images undergo a conversion into video images by using a video camera for constituting digital images I1, I2 of size $N \times N$ pixels (image points, N being conventionally equal to 512), coded with a dynamics which is e.g. 256 grey levels. These operations correspond to the stage shown in block 10. Following said conversion into digital video images, the process consists of carrying out a number of operations on the two images and which are represented by the block 20 in FIG. 1.

One of the first processing operations consists of carrying out a correction of each of the images relative to itself. This involves a first morphological filtering on classified (non-linear) points or a linear frequency filtering of the arrays of pixels of each image. This filtering makes it possible to eliminate the local minima and maxima of the different elementary subsets of pixels constituting these arrays. Thus, the images undergo a "smoothing".

This is followed by a second filtering, which can be a morphological or frequency filtering. In the first case, said operation corresponds to an expansion, erosion and subtraction of the image from the background compared with the actual image.

During a frequency filtering, the frequencies corresponding to the faults which it is wished to reveal are eliminated from the initial image.

These first corrections of the image compared with itself make it possible, as will be shown subsequently, not to add as from the start of the processing operations noise due to the positioning defect of a reference part generally used for detaching the image from the background.

These operations correspond to the stage represented by functional block 31 in FIG. 1:

I1/I1→F1

I2/I2→F2

According to the process and as will be described in greater detail hereinafter, use is also made of a reference part for correcting these images, but these processing operations intervene following the first filtering operations, so that the image already has a better signal-to-noise ratio.

The process then consists of carrying out a second correction of each image. This correction can be performed by operations of subtracting or dividing the image compared with the reference image, in order to detach the image from the background details.

The background is obtained by a reference image taken of a part of the same type, but which has no fault, the shooting conditions of the reference part being identical to those used for the various inspections.

This stage corresponds to functional block 32 in FIG. 1:

F1/REF→G1

F2/REF→G2

In order to further reduce the random noise, according to a variant it would be successively possible to obtain two reference images of the same reference part for filtering one of the images by one of the said reference images and the other image by the other reference image.

The process then consists of carrying out a binarization of each of the thus corrected images. This stage corresponds to functional block 33 in FIG. 1.

Binarization is carried out by thresholding the images. For this purpose use is made of a predetermined double threshold in order to eliminate from the image the pixels located outside these threshold values. The threshold corresponds to one of the grey levels of the coded images. For example, the chosen threshold is 0.123:

S2>G1>S1    T1

S2>G2>S1    T2

After binarizing the two images, a logic AND is produced between these two images so as to only retain the pixels common to both images and which represent the presence of faults. This stage corresponds to functional block 34 in FIG. 1.

All these processing operations make it possible to separate from the background the possible faults contained in the part to be analysed and to represent the same in the form of a binary image. The processing of the two images prior to thresholding makes it possible to render the brightness uniform, minimize the influence of the background noise, increase the image contrasts and therefore facilitate their binarization.

The use of at least two images of a same view then makes it possible by means of the logic AND function, following all the processing operations, to improve the signal-to-noise ratio. Therefore the level of false alarms is reduced. Thus, the process according to the invention makes it possible to reduce the number of cases when it is stated that there is a detection of a fault when in actual fact no such fault exists.

The image processing operations by linear frequency or morphological filtering are performed in a conventional manner by means of specialized processors, which are commercially available.

FIG. 2 is the diagram of an apparatus for performing the process. The apparatus comprises an X-ray tube 50, which makes it possible to pass X-rays through the part 60 to be inspected. Obviously, means can be provided for displacing the said part 60 in automatic manner beneath the axis of the radiation of the tube 50, so as to obtain different views of said part. These means are not shown in the drawing.

In the axis under which the radiation takes place are located means 70 incorporating means for the detection 71 and focussing 72 of electrons obtained by the passage of X-photons through the crystalline structure of the object 60. These means also include an output screen 73 for the conversion of electrons/photons.

A video camera 90 makes it possible to transform the photon image into a video signal in the form of a digital image representing the structure of the object.

Between the output screen 73, which forms part of the detection/focussing unit 70 and the camera 90, can be located a 45° mirror making it possible to reflect the light beams back along the axis in which is located the camera 90. This mirror is designated 80 in the drawing. The video signal from the camera 90 reenters the processing means 100, which are coupled to an operator console 110.

The elements of said apparatus (which constitute the inspection or control chain) are electronically connected to said operator console 110, so that the operator can control the different operations and in particular the different positional settings of the elements with respect to one another. All the setting and position control operations are of a conventional nature and are known to the Expert.

The processing means 100 are conventional image processing means having storage means and processors. A first processor e.g. makes it possible to carry out image integration operations. The images processed according to this process are obtained following the integration of N images in each case. Image integration is a well known procedure and which is used for reducing noise.

In known manner, the processing means also incorporate one or more specialist processors making it possible to obtain the various grey level image linear frequency or morphological filtering processes and the binary, mathematical morphological filtering processes allowing binary images to be obtained.

According to the invention, the detection means 70 incorporate a brightness amplifier 71, a focussing optics 72 and an output screen 73, which has a diameter smaller than that of the brightness amplifier. The camera is a CCD or tube camera.

As has been stated hereinbefore, each of the images obtained is the result of an integration of N images, N being e.g. equal to 250 for each image. According to an embodiment, the 250 image integrations are carried out in ten seconds.

Thus, the process according to the invention, instead of integrating one image N times and whilst leaving behind residual interference as in the known inspection processes, provides for the integration of two images N/2 times and thus leads to the advantages indicated hereinbefore without any significant increase in the acquisition time.

I claim:
1. Process for the detection of faults and defects in material used in the formation of a mechanical part comprising the following stages:
 a. X-ray irradiating the part at least twice under identical conditions and in accordance with the same view of the part;
 b. obtaining at least two X-ray screen images for each view of the part to be inspected;
 c. conversion of these screen images into digital video images coded on several grey levels; d. processing each image, said processing involving the following substages i. to iv. including:
  i. correction by digital filtering of each image compared with itself;
  ii. correction of the filtered images by comparison with a reference image;
  iii. binarization of the images by the comparison of each image with a threshold in order to only retain the image points which are equal to or higher than said threshold and which are liable to correspond to a fault in the part; and
  iv. superimposing the images in order to determine the image points which correspond to faults thus detecting the faults in the part.

2. Acquisition and processing process according to claim 1, characterized in that the correction substage of each image by digital filtering consists of carrying out a linear frequency or non-linear morphological filtering of the arrays of pixels of each image in order to eliminate the local minima and maxima of the different elementary subsets of pixels constituting the arrays and a second frequency or morphological filtering of each image compared with itself making it possible to obtain a filtered image.

3. Acquisition and processing process according to claim 1, characterized in that the correction of each filtered image by comparison with a reference image consists of obtaining a reference image from a part of the same type, but having no defect, making said reference image undergo the same steps a.–d.i. as the image of the part to be inspected and comparing each image with said reference image by carrying out a subtraction or division of the corresponding arrays of pixels.

4. Process according to claim 1, characterized in that the correction of each reference image consists of obtaining two reference images from a part not having a fault and comparing one image with a reference image and the other image with the other reference image by subtraction or division of the corresponding arrays of pixels.

5. Acquisition and processing process according to claim 3, wherein the reference image that undergoes steps a.–d.i. further comprises the steps of:
 processing the reference image corresponding to steps d.ii–d.v. wherein the reference image is corrected in step d.ii with a different reference image acquired and processed corresponding to steps a.–d.i.

6. Apparatus for the detection of faults and defects in materials used in the formation of a mechanical part, comprising:
 a X-ray tube, which makes it possible to pass X-rays through the part to be inspected;
 a real time detector equipped with a brightness amplifier;
 a focussing optics;
 a mirror for reflecting each photon image from the focussing optics;
 cameras for receiving the images reflected by the mirror:
 means for obtaining at least two images of a part to be inspected for each view of the part;
 means for processing the images incorporating:
  first correction means performing a filtering of each image compared with itself;
  second correction means performing a filtering compared with a filtered reference image;
  means for thresholding each image;
  means ensuring a logic AND function between the images after thresholding.

7. Apparatus according to claim 6, characterized in that the means for obtaining at least two images incorporate an X-ray source, a real time detector equipped with a brightness amplifier, a focussing optics, a mirror for reflecting each photon image from the focussing optics and cameras for receiving the images reflected by the mirror.

8. Apparatus according to claim 6, characterized in that the first image correction means comprise a first non-linear digital filter of the median or frequency filter type and a second digital filter of the morphological or frequency type.

9. Apparatus according to claim 7, characterized in that the first image correction means comprise a first non-linear digital filter of the median or frequency filter type and a second digital filter of the morphological or frequency type.

10. Process according to claim 2 characterized in that the correction of each reference image consists of obtaining two reference images from a part not having a fault and comparing one image with a reference image and the other image with the other reference image by subtraction of division of the corresponding arrays of pixels.

11. Process according to any one of claims 1, 2, 3, 4, 5 or 10, characterized in that the superimposing of the images is performed by using a logic AND function.

12. Apparatus according to any one of claims 6, 7, 8 or 9, characterized in that the means for obtaining the reference image are produced for the same apparatus from a part not having said fault, the processing means incorporating means for storing said image.

* * * * *